United States Patent
Riley et al.

(10) Patent No.: US 10,845,474 B1
(45) Date of Patent: Nov. 24, 2020

(54) PULSE IDENTIFICATION IN A LIGHT DETECTION AND RANGING, SONAR, OR RADAR SYSTEM

(71) Applicant: Rockwell Collins, Inc., Cedar Rapids, IA (US)

(72) Inventors: Mitchell A. Riley, Marion, IA (US); John G. Bendickson, Vinton, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 374 days.

(21) Appl. No.: 15/587,138

(22) Filed: May 4, 2017

(51) Int. Cl.
*G01S 13/28* (2006.01)
*G01S 13/95* (2006.01)
*G01S 17/26* (2020.01)
*G01S 15/10* (2006.01)

(52) U.S. Cl.
CPC .......... *G01S 13/284* (2013.01); *G01S 13/953* (2013.01); *G01S 17/26* (2020.01); *G01S 15/104* (2013.01)

(58) Field of Classification Search
None
See application file for complete search history.

(56) References Cited

U.S. PATENT DOCUMENTS

| | | | |
|---|---|---|---|
| 2007/0073486 A1* | 3/2007 | Tillotson | G01W 1/00 702/3 |
| 2015/0168554 A1* | 6/2015 | Aharoni | G01S 17/74 342/27 |
| 2016/0047895 A1* | 2/2016 | Dussan | G01S 7/484 356/4.01 |
| 2016/0334513 A1* | 11/2016 | Stathis | G01S 17/89 |
| 2018/0239004 A1* | 8/2018 | Dussan | G01S 7/4873 |

* cited by examiner

*Primary Examiner* — Whitney Moore
(74) *Attorney, Agent, or Firm* — Suiter Swantz pc llo

(57) ABSTRACT

A platform operates in an environment with other platforms using active sensing. The platform includes an active sensing system configured to provide a point cloud associated with the environment. The point cloud is used to navigate the platform. The active sensing system includes a transmitter configured to provide pulses of electromagnetic energy in a light band or a radar band or sonic energy and a receiver configured to receive returns associated with the pulses striking one or more targets in the environment. The transmitter is configured to impose a code onto the pulses, and the receiver is configured to detect the code to determine when the pulses of light where transmitted or to determine a source of the pulses.

20 Claims, 4 Drawing Sheets

PULSE IDENTIFICATION IN A LIGHT DETECTION AND RANGING, SONAR, OR RADAR SYSTEM

BACKGROUND

The inventive concepts disclosed herein relate generally to the field of sensor systems. More particularly, embodiments of the inventive concepts disclosed herein relate to systems and methods for pulse identification in a light detection and ranging (LIDAR) systems, sound navigation and ranging (sonar) systems, and radar systems.

Autonomous and non-autonomous vehicles use active sensors such as LIDAR and radar systems to detect objects and targets and provide guidance for operating the vehicles. For example, LIDAR systems provide optical pulses to the environment and receive return pulses which are processed to locate objects and targets in the environment. The optical pulses are provided to space in the environment to develop LIDAR data indicating the presence and location of targets in the environment (e.g., a point cloud). Identifying returns from the particular transmitted optical pulses can be difficult. For example, differentiating returns in a crowded environment where more than one LIDAR system is emitting optical pulses can be difficult. Radar systems provide radar pulses and receive radar returns for target location and detection. The radar returns also can be difficult to differentiate in crowded environments.

SUMMARY

In one aspect, the inventive concepts disclosed herein are directed to a light detection and ranging system. The light detection and ranging system includes a transmitter configured to provide pulses of light and a receiver configured to receive returns associated with the pulses of light striking one or more targets. The transmitter is configured to provide a code onto the pulses of light, and the receiver is configured to decode the code to determine when the pulses of light were transmitted or to determine a source of the pulses of light.

In a further aspect, the inventive concepts disclosed herein are directed to a radar system. The radar system includes a transmitter configured to provide pulses of radar signals and a receiver configured to receive returns associated with the pulses of the radar signals striking one or more target. The transmitter is configured to impose a code onto the pulses of the radar signals, and the receiver is configured to detect the code to determine when the pulses of the radar signals were transmitted or to determine a source of the pulses of the radar signals.

In a further aspect, the inventive concepts disclosed herein are directed to a platform that operates in an environment with other platforms using active sensing. The platform includes an active sensing system configured to provide a point cloud associated with the environment. The point cloud is used to navigate the platform. The active sensing system includes a transmitter configured to provide pulses of electromagnetic energy in a light band or a radar band and a receiver configured to receive returns associated with the pulses striking one or more targets in the environment. The transmitter is configured to impose a code onto the pulses, and the receiver is configured to detect the code to determine when the pulses of light where transmitted or to determine a source of the pulses.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
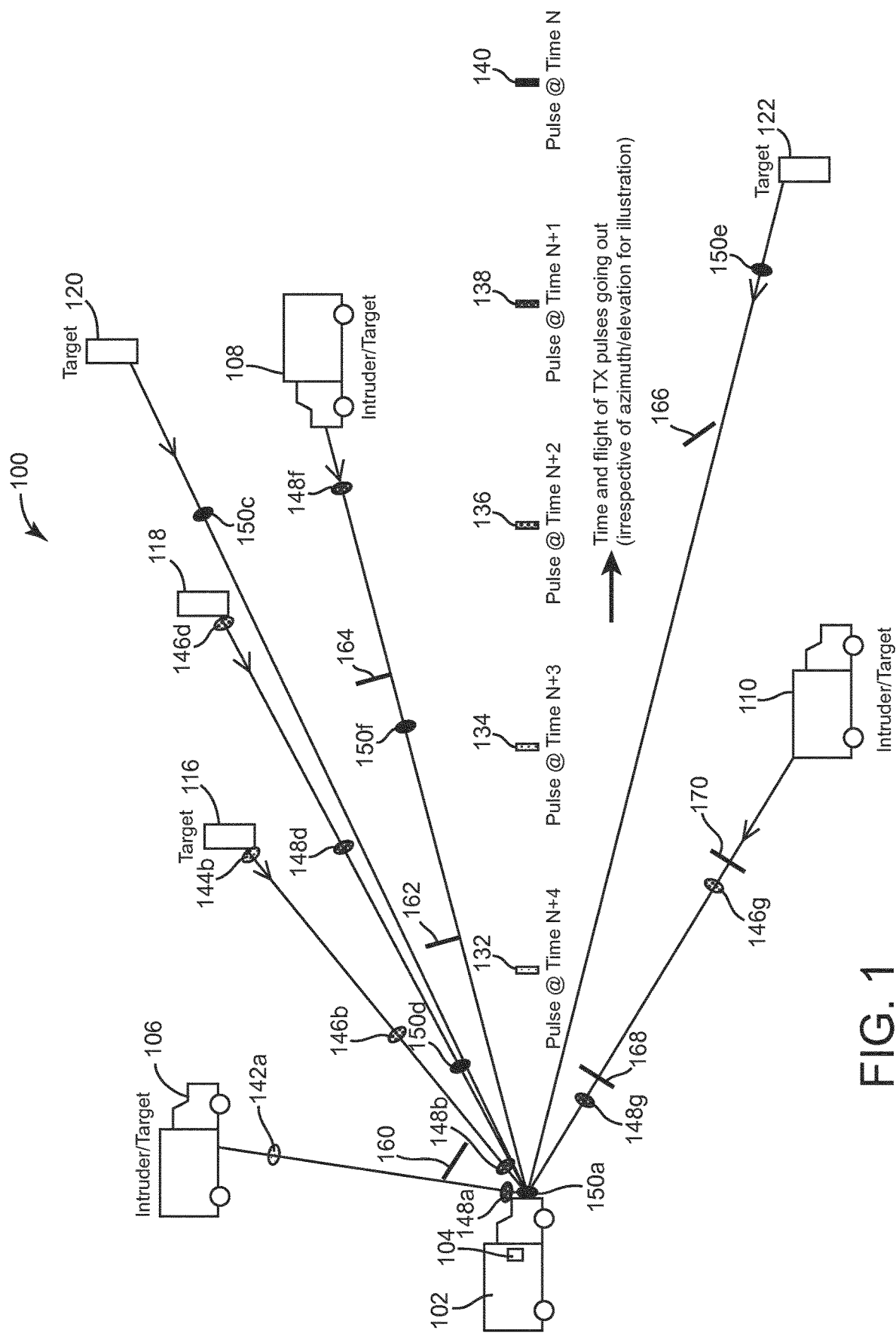
FIG. 1 is a schematic illustration of an environment including number of platforms with at least one platform equipped with a sonar, radar or LIDAR system using a pulse identification technique according to exemplary aspects of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Embodiments of the inventive concepts disclosed herein are directed to systems and methods of identifying pulses associated with an active sensing system such as a sound navigation and ranging sonar, LIDAR, or radar system. Identification of the pulses allows return data (e.g., a point cloud) to be generated more quickly and with less interference in some embodiments. Certain applications (automated navigation or control applications) use point clouds including 50,000 to 5,000,000 individual points which accentuates the need for faster accumulation of data for active sensors.

Conventional techniques achieve suppression of non-relevant transmitters by randomization of transmit timing for large numbers of transmit pulses for every point of aim of the system. The use of randomization for transmit timing may be adequate for two dimensional (2D) sensing systems (e.g., 2D radar) but is fairly slow. The use of randomization for transmit timing for 3D point clouds (e.g., for use by unmanned aviation vehicles and other vehicles traveling at higher speeds) can be inadequate as higher transmission repetition rates are required and the updates must be very fast (e.g., especially in vehicles (e.g., cars/trucks) that operate in close proximity to many other vehicles and move at legal speeds exceeding 75 MPH (110 feet per second)). The higher transmission repetition rates are necessary to fill a 3D point cloud many times per second (10 or more) with highly averaged data per azimuth/elevation in some embodiments.

Transmission repetition rates are limited to a rate of not less than twice flight time to the target at the speed of light (roughly 1000 feet per microsecond multiplied by two (for round trip)) using conventional randomization suppression techniques. Transmission repetition rates are also limited by the power dissipation associated with high transmission repetition rates incurred by the transmitting (TX) device. In addition, the use of multiple range returns (first, second, and third range returns) is not possible with a conventional system, since the conventional system cannot discern second and third range returns from the first range returns. Embodiments of the systems and methods based on the inventive concepts disclosed herein can discern second and third range returns from one another and thus allow much higher transmission repetition rates. Accordingly, embodiments of the systems and methods based on the inventive concepts disclosed herein use a technique other than or in addition to randomization of transmit timing for suppression of non-relevant transmitters (e.g., imposing unique codes on the transmitted pulses).

The active sensing system is integrated with a platform according to some embodiments. For example, the platform is a manned or unmanned avionics platform or a land vehicle in some embodiments. The active sensing system is used with a display for showing targets in the environment or with a navigation system which uses the point cloud data to control the platform in some embodiments. Systems and methods in accordance with the inventive concepts disclosed herein can allow for hazards to be detected and identified for human-in-the-loop operations and for totally autonomous operations.

Active sensing systems and methods in accordance with some embodiments encode onto the transmit pulse a binary code that is extracted from the received pulse to determine if a return belongs to this transmitting system, a foreign transmitting system or if the return is from a first, second or third range from this transmitting system. In some embodiments, the binary code is modulated (e.g., by pulse width modulation (PWM)) directly onto a transmitted sonic pulse, light pulse or radar pulse. The modulation is provided by switching on and off the power to a laser transmitter (e.g., a laser diode) in a LIDAR system in some embodiments. The receiver has sufficient bandwidth to detect the pulse train with the code, and the sampled digitized data is provided through a high speed digital signal processing system (DSP) system (e.g., a field programmable gate array filter to filter out non-relevant return information (e.g., intruder pulses) and/or route first, second, third, or more range data appropriately to data bins. The ability to differentiate first, second, third, or more range data allows the system to differentiate multi range returns from one another, thereby significantly increasing the transmit pulse repetition rate without incurring confusion as to when transmit pulses was provided. The ability to determine multi range returns is accomplished by using a series of unique codes that may repeat in some embodiments.

Referring to FIG. 1, an environment 100 includes a platform 102, which includes an active sensing system 104. The environment 100 also includes platforms 106, 108 and 110. Although four platforms 102, 106, 108 and 110, are shown in the environment 100, any number of platforms can exist in the environment 100. The platforms 102, 106, 108 and 110 are exemplarily depicted as trucks or land vehicles in FIG. 1, however, the platforms 102, 106, 108 and 110 can be any type of platform including naval platforms, avionic platforms, etc. In some embodiments, the platforms 102, 106, 108 and 110 are any of cars, trucks, manned aircraft, unmanned aircraft, robotic equipment, etc. The platforms 106, 108 and 110 can also include their own active sensing system similar to the active sensing system 104. The platform 102 can be a piloted vehicle (e.g., piloted airborne platforms, piloted aircraft, trainer aircraft), a remotely controlled vehicle (e.g., remotely controlled automobiles or drones, unmanned aircraft (e.g., UAV)), or an autonomous vehicle (e.g., unmanned autonomous vehicles).

The environment 100 also includes targets 116, 118 and 120. Platforms 106, 108, 110 can also be considered targets similar to targets 116, 118, 120 and 122. In some embodiments, targets 116, 118 and 120 are objects or living things. In some embodiments, targets 116, 118 and 120 are portable or moving objects or are stationary.

The active sensing system 104 is a sonar system, a radar system a LIDAR system, or any other system that uses time of flight associated with transmitted energy in some embodiments. The active sensing system 104 surveys the environment 100 as a field of passive reflectors in some embodiments. The active sensing system 104 provides transmit pulses 132, 134, 136, 138 and 140 to the environment 100. The active sensing system 104 provides a series of pulses similar to the pulses 132, 134, 136, 138, and 140 at various azimuth and elevation settings in some embodiments. The pulses 132, 134, 136, 138, and 140 are repeated in a sequence at the various azimuth and elevation settings to cover the three dimensional space associated with the environment 100 in some embodiments. Each of the pulses 132, 134, 136, 138, and 140 includes a unique code as a rider on the signal in some embodiments.

The transmit pulse 140 is a first pulse provided at a time $N_0$ and is uniquely identified. The unique identification includes identification of the source of the pulse (e.g. the active sensing system 104 or the platform 102) and the time at which the pulse was provided. The time can be an actual time, a relative time, a number associated with its place in a series of pulses, or an indication of a range bin in some embodiments. In some embodiments, the unique identification indicates an azimuth and/or elevation setting for the pulse 140.

In some embodiments, the pulse 140 has a unique identification code and the active sensing system 104 includes a look up table storing parameters for the unique identification code. The parameters include the source of the pulse (e.g. the active sensing system 104), the time at which the pulse was sent, and/or the azimuth and/or elevation setting for the pulse. In some embodiments, the active sensing system 104 provides the transmit pulses 132, 134, 136, 138 and 140 in a reoccurring pattern of azimuth and elevation settings. The reoccurring pattern can be coded with each pulse such that the source of the pulse, the azimuth and elevation direction of the pulse, and the timing of the pulse is encoded on the pulse so that the active sensing system 104 can use such information when a return is received.

The transmit pulses 132, 134, 136 and 138 are similar to the pulse 140 and are uniquely identified in some embodiments. The unique identification for transmit pulses 132, 134, 136 and 138 can include an indication that when the pulses are provided, as well as the source of the pulses similar to the transmit pulse 140. In some embodiments, the transmit pulse 138 is provided at a time $N_1$, the transmit pulse 136 is provided at a time $N_2$, the transmit pulse 134 is provided by a time $N_3$, and the transmit pulse 132 is provided at a time $N_4$. The times $N_{0-4}$ can span a period of four fixed time intervals such that each of the transmit pulses 132, 134, 136, 138 and 140 is separated by the same amount of time. Alternatively, other time periods or intervals can be utilized. For example, the time intervals between the transmit pulses 132, 134, 136, 138 and 140 is separated by the random amount of time in some embodiments.

Returns 142a, 144b, 146b, 146d, 146g, 148a, 148b, 148f, 148g, 150a, 150c, 150d, and 150e are associated with the transmit pulses 132, 134, 136, 138 and 140 (where the reference numerals 142, 144, 146, 148, and 150 for the returns 142a, 144b, 146b, 146d, 146g, 148a, 148b, 148f, 148g, 150a, 150c, 150d, and 150e respectively correspond to the transmit pulses 132, 134, 136, 138, and 140). The returns 142a, 148a, and 150a are associated with the respect transmit pulses 132, 148, and 150 provided at the azimuth and elevation setting for the space in which the platform 106 is located while the return 146b is associated with the respect transmit pulse 146 provided at the azimuth and elevation setting for the space in which the target 116 is located in some embodiments. Similarly, the returns 148f, and 150f are associated with the respect transmit pulses 148, and 150 provided at the azimuth and elevation setting for the space in which the platform 108 is located while the return 150e is associated with the respect transmit pulse 150 provided at the azimuth and elevation setting for the space in which the target 122 is located in some embodiments The returns 142a, 148a and 150a are associated with the transmit pulses 132, 138 and 140 striking the platform 106. The returns 144b, 146b and 148b are associated with the transmit pulses 134, 136 and 138 striking the target 116. The return 150c is associated with the transmit pulse 140 striking the target 122. The returns 146d, 148d and 150d are associated with the transmit pulses 136, 138 and 140 striking the target 118. The return 150e is associated with the transmit pulse 140 striking the target 120. The returns 148f and 150f are associated with the transmit pulses 138 and 140 striking the platform 108. The returns 146g, and 148g are associated with the transmit pulses 136 and 138 striking the platform 110.

Intruder or noise pulses 160, 162, 164, 166, 168 and 170 are in the environment 100. The intruder or noise pulses 160, 162, 164, 166, 168 and 170 can be associated with other active sensing systems in the environment 100, be intentionally created by a spoofing system, or be noise created by interference or electronics in the environment 100. The intruder or noise pulses 160, 162, 164, 166, 168 and 170 can represent any type of noise in the environment 100. The active sensing system 104 uses the identification associated with the transmit pulses 132, 134, 136, 138 and 140 to identify the appropriate range bin and to differentiate and ignore the intruder or noise pulses 160, 162, 164, 166 and 168. In some embodiments, the intruder or noise pulses 160, 164, 166, 168 and 170 represent pulses or returns from the pulses associated with active sensing systems on platforms 106, 108 and 110 or targets 116, 118 and 120.

Figure 2:
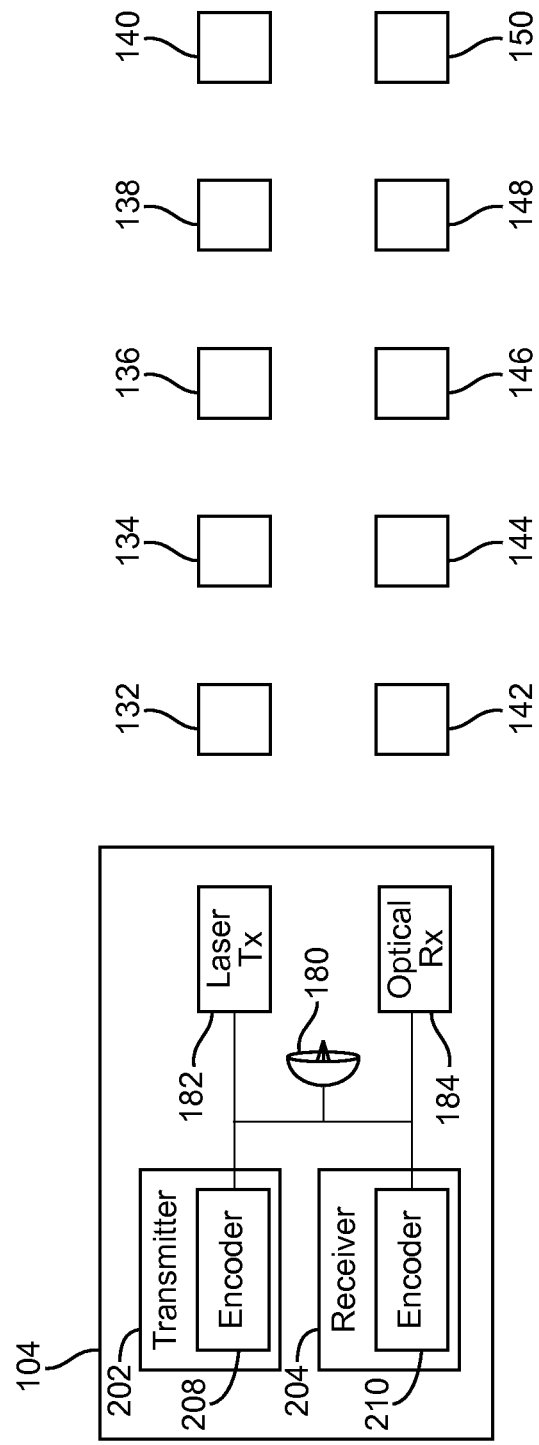
FIG. 2 is a general block diagram of the sonar, radar or LIDAR system illustrated in FIG. 1 according to exemplary aspects of the inventive concepts disclosed herein.

With reference to FIG. 2, the active sensing system 104 is a weather radar coupled with an antenna 180 for providing and receiving radar pulses or a LIDAR system including a laser transmitter 182 for transmitting optical pulses and a camera or optical receiver 184 for receiving optical pulses. In some embodiments, the active sensing system 104 is a weather radar system mounted on an aircraft and configured as described herein. In some embodiments, the active sensing system 104 is a sonar system providing sonic pulses.

The active sensing system 104 includes a transmitter 202 and a receiver 204. The transmitter 202 includes an encoder 204 for providing identification information to the transmit pulses 132, 134, 136, 138 and 140. The receiver 204 includes a decoder 210 for decoding the information on the returns 142, 144, 146, 148 and 150 associated with the transmit pulses 132, 134, 136, 138 and 140. The transmitter 202 includes circuitry for amplifying, filtering, and converting signals for the provision and timing of the transmit pulses 132, 134, 136, 138 and 140. The receiver 204 includes circuitry for amplifying, filtering, and converting signals for the reception and the processing of the returns 142, 144, 146, 148 and 150.

In some embodiments, the encoder 208 is configured as an on/off keying circuit or a frequency modulator. In some embodiments, the encoder 208 is a frequency modulation (FM) demodulator in some embodiments. In some embodiments, the FM rate that is the basis of the frequency modulated carrier wave is used to encode the identifying information. In some embodiments, the encoder 208 provides the code as amplitude modulation or FM on the transmitted carrier wave.

The encoder 208 can utilize various encoding techniques. Generally, the encoder 208 modulates a carrier wave in the optical range or the radar range of the electromagnetic frequency spectrum. The light range generally is in the 100 nanometer to 100 micrometer wavelength range, and the radar range is generally in the one millimeter to one meter wavelength range (e.g. X band, Ka band, K band, etc.). The light range can include invisible light, infrared light, near ultraviolet light, etc.

The decoder 210 is an FM demodulator or decoding circuit in some embodiments. The decoder 210 can utilize various techniques for decoding the information on the returns 142, 144, 146, 148 and 150 associated with the transmit pulses 132, 134, 136, 138 and 140.

The transmitter 202 and the receiver 204 can each include a processor and a memory. The processor can be implemented as a specific purpose processor, an application specific integrated circuit (ASIC), one or more field programmable gate arrays (FPGAs), a group of processing components, or other suitable electronic processing components. The memory is one or more devices (e.g., RAM, ROM, flash memory, hard disk storage) for storing data and computer code for completing and facilitating the various processes described in the present disclosure. The memory may be or include volatile memory or non-volatile memory and may include database components, object code components, script components, or any other type of information structure for supporting the various activities and identification information processes disclosed herein. The memory is communicably connected to the processor and includes computer code or instruction modules for executing one or more processes described herein. The memory includes various circuits, software engines, and/or modules that cause the processor to execute the systems and methods described herein.

Figure 3:
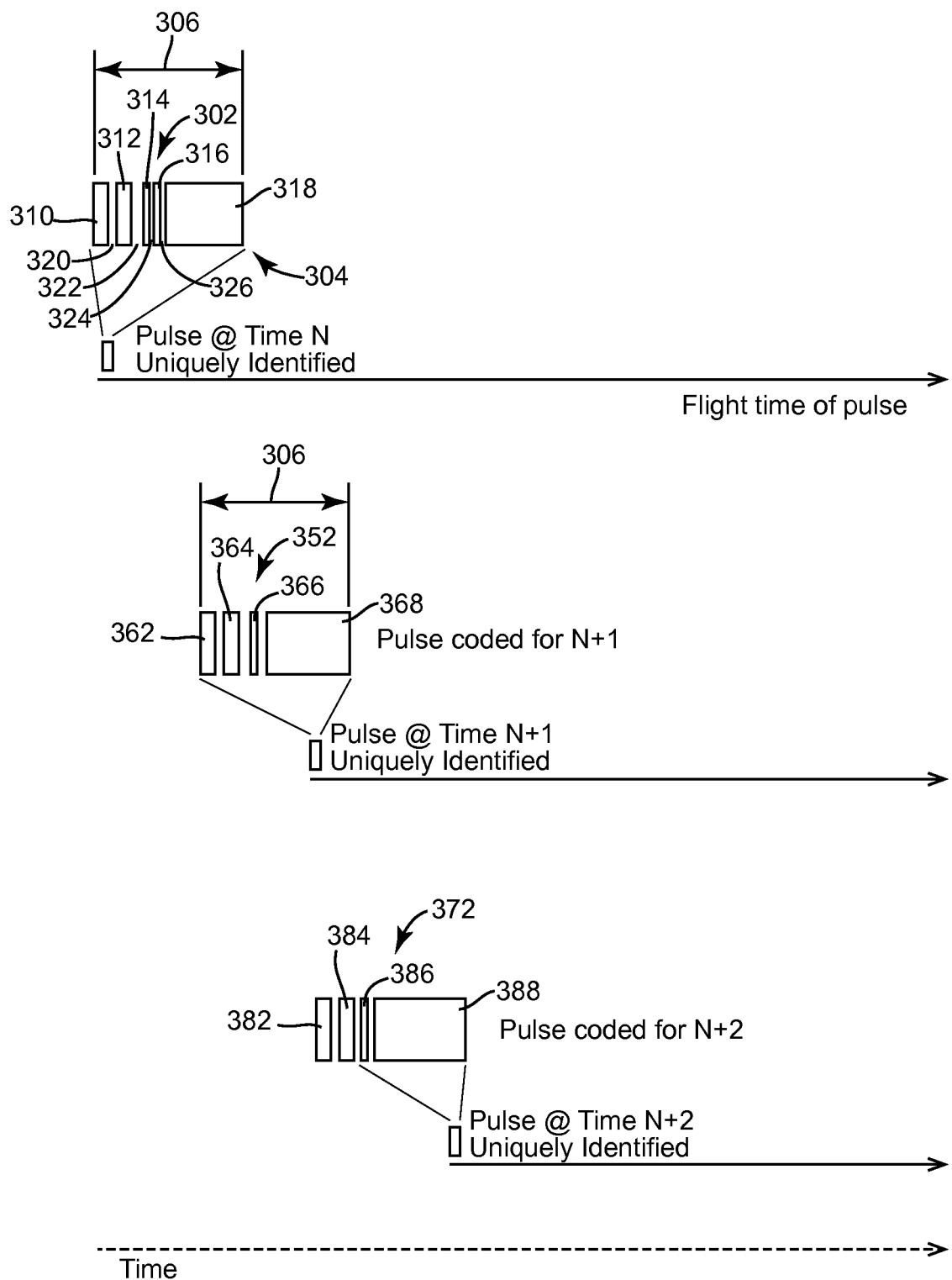
FIG. 3 is a schematic representation of coded pulses for the sonar, radar or LIDAR system illustrated in FIG. according to aspects of the inventive concepts disclosed herein.

With reference to FIG. 3, a transmit pulse 302 is provided as coded, transmitted electromagnetic energy, such as a light pulse or a radio frequency (RF) pulse. In some embodiments, the transmit pulse 303 is a sonic pulse. The transmit pulse 302 includes a binary code 304 provided within a pulse width 306 (e.g., 25, 50, or 100 nanoseconds) of the transmit pulse 302. The binary code is provided using portions 310, 312, 314, 316, and 318 of electromagnetic energy and portions 320, 322, 324, and 326 of different or no electromagnetic energy between the portions 310, 312, 314, 316 and 318. The portion 306 is a wider portion than the portions 310, 312, 314, and 316 in some embodiments.

The portions 310 and 312 and portions 320 and 322 can serve as a preamble that indicate a source of the pulse and portions 314 and 316 and the portions 320 and 322 (e.g., off periods) associated with the portions 314 and 316 can indicate a time of the pulse. The particular patterns shown in FIG. 3 are exemplary only. Alternatively, the portions 310, 312, 314, and 316 provide a unique identification for the pulse which can be used to identify source and timing. Portions 320, 322, 324, and 326 can be an off period or a period at a different carrier frequency.

A transmit pulse 352 is similar to the transmit pulse 302 and includes portions 360, 362, 364, and 366 indicating a timing, source, or identification of the pulse. The transmit pulse 352 can include a wider portion 368. A transmit pulse 372 is similar to the transmit pulses 302 and 352 and includes portions 360, 362, 364, and 366 indicating a timing, source, or identification of the pulse. The transmit pulse 372 can include a wider portion 388.

In some embodiments, the transmit pulses 302, 352 and 372 have the same pulse with 306. The transmit pulses 302, 352 and 372 can correspond to transmitted pulses 132, 134, 136, 138 and 140 discussed with reference to FIGS. 1 and 2. The transmit pulse 352 is provided at the time $N_1$, which is after the time $N_0$ associated with the pulse 302. The pulse 372 is provided at the time $N_3$. In some embodiments, the time $N_1$ is one period after the pulse 302, and the time $N_2$ is two periods after the pulse 302. The time periods between pulses can be approximately 250, 500 or 1000 nanoseconds. Alternative pulse widths 306 and time periods between the transmit pulses 302, 352, and 352 can be selected based upon design criteria and system parameters, such as desired pulse repetition frequency rates.

The transmit pulses 302, 352, and 372 can include longer periods of coded sections for providing additional information. In some embodiments, the first 50% of the pulse width 306 associated with the portions 310, 312, 314, and 316 and the portions 320, 322, 324, and 326 is used for coding information. In some embodiments, the time period for the portions 310, 312, 314, and 316 is a small percentage of the pulse width 306. In some embodiments, the pulse width 306 is a small percentage of the time between times $N_1$ and $N_2$. In some embodiments, the coded portions 310, 312, 314 and 316 can occupy a small percentage of the pulse width 306 or span the entire duration of the pulse length 306. In some embodiments, the portions 318, 368, and 388 all have the same length and the length is an indication that the pulse transmission is completed. In some embodiments, the portions 318, 368, and 388 are coded to indicate an end of the pulse message. In some embodiments, the portions 318, 268, and 388 take up more than 50 percent of the pulse width 306.

In some embodiments, the pulses 302, 352, and 372 include one of 16 to 32 binary codes in a series which allow the transmitter 202 (FIG. 2) to be operated at much higher pulse repetition rates than otherwise would be allowed due to either range overlaps (2nd, 3rd, or more range returns) or the maximum required range desired. For example, if the maximum range desired is 1000 feet (e.g., for a vehicle traveling at 110 or more feet per second), a conventional system would be limited to a pulse repetition rate of once every 2 micro seconds (or 500,000 pulses per second). With overlapped flight times for the transmit pulses 302, 352, and 372, a higher pulse repetition rate is achieved, thereby updating the point cloud more quickly at higher resolution than would otherwise be allowed. Higher resolution at higher speed allows timelier vehicle control decisions in some embodiments.

Figure 4:
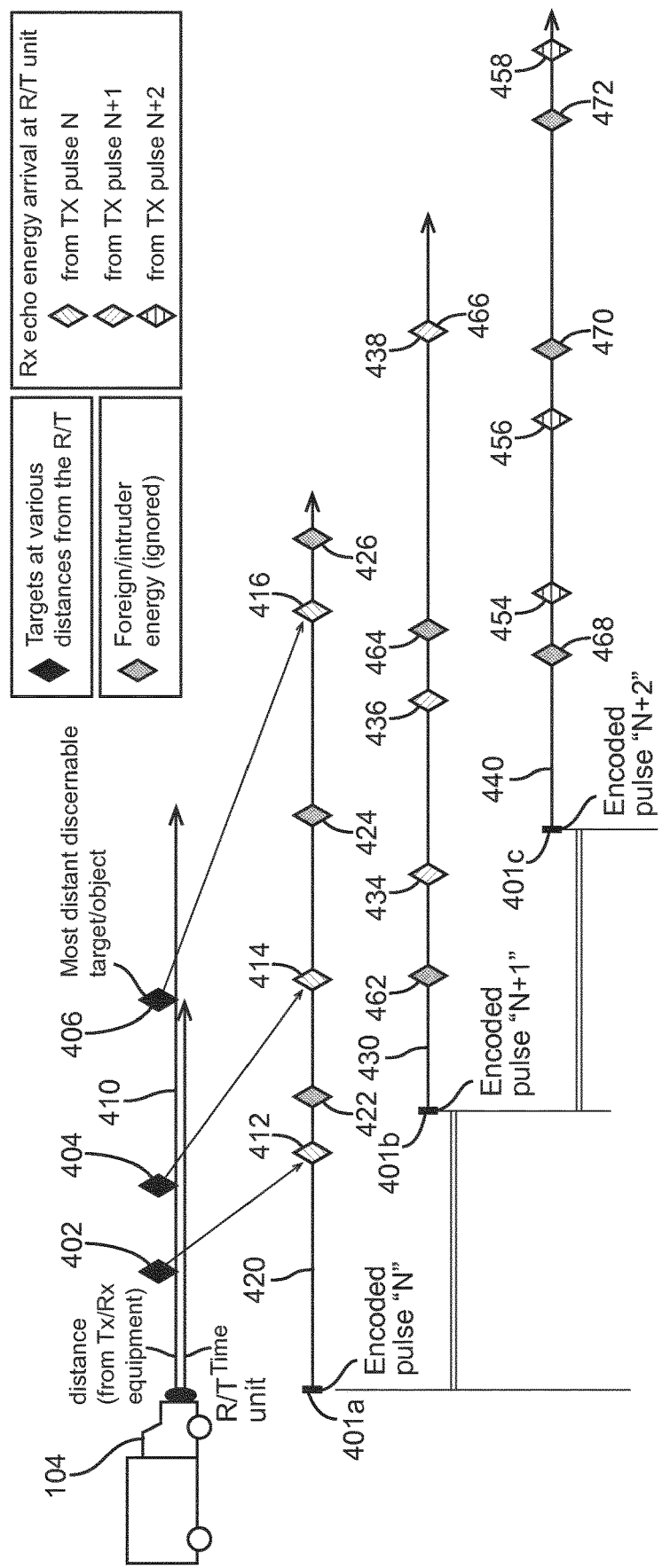
FIG. 4 is a schematic representation of coded pulses striking targets in an environment of the sonar, radar or LIDAR system illustrated in FIG. 2 according to aspects of the inventive concepts disclosed herein.

With reference to FIG. 4, the active sensing system 104 provides transmit pulses 401a, 401b, and 401c to targets 402, 406 and 408 on an x axis 410 representing distance. Return pulses 412, 414 and 416 are associated with the transmit pulse 401a provided at time $N_0$, where each of the return pulses 412, 414 and 416 reflects from targets 402, 404 and 406, respectively. The returns 412, 414, 416 are shown on an X axis 420 representing time. Electromagnetic energy or noise 422, 424 and 426 represent pulses from other active sensing system or electromagnetic noise. The returns 412, 414 and 416 advantageously include identification information, identifying the pulse returns as being sourced from the active sensing system 104 and being part of a first range transmit pulse (e.g., the pulse 401a).

The transmit pulse 401a travels at roughly the speed of light outward from the active sensing system 104 and encounters the targets 402, 406, and 408 such that a return of electromagnetic energy is reflected back towards the active sensing system 104 where the receiver 204 and decoder 210 processes the returns 402, 404, and 406. The returns 404, 406, and 408 are processed to calculate a round trip time for the return to determine the existence of the targets 402, 404 and 406 and the distance to the targets 402, 406 and 408. Without range pulse identification, there is a limit on the minimum pulse repetition rate that is equal to twice the maximum distance to target to allow for flight time there and back from targets 402, 406 and 408. Advantageously, returns 412, 414 and 416 include coding which enables the difference between transmit pulses 401a-c to be discerned such that the repetition rate of the transmit pulses 401a-c can be greatly increased.

Returns 434, 436 and 438 are provided on an X axis 430 representing time and are associated with the transmit pulse 401*b* provided at time $N_1$. The returns 454, 456 and 458 are provided on an X axis 440 representing time and are associated with the transmit pulse 401*c* provided at time $N_2$. Interfering pulses or noise 462, 464, 466, 468, 470, and 472 represent noise or intruding pulses. The ability to discern return identification information reflected from coded transmit pulses 401*a-c* from other pulses gives the ability to discern the return pulses 412, 414, 416, 434, 436, 438, 454, 456, and 458 from other active sensing units operating in the environment without having to resort to or rely exclusively on pulse time randomization techniques. This allows a pulse to pulse time to be lowered, providing a greater data rate for the active sensing system 104. In addition, coding for time slots associated with the return pulses 412, 414, 416, 434, 436, 438, 454, 456, and 458 allows the ability to discern or differentiate transmit pulses 401*a-c* from the same active sensing system 104 which allows high speed operations as the returns 412, 414, 416, 434, 436, 438, 454, 456, and 458 can overlap.

The active sensing system 104 can be utilized in various applications. For example, the active sensing system 104 can be embodied in a commercial (civil) weather radar (e.g., ranges from short (5 miles) to extremely long range (320 miles)), a military/civil terrain mapping system, a mapping radar where short to medium ranges are of interest, a pacer CRAG radar where a weather radar system is a station keeping tool for military jets and tankers in a crowded arena. In some embodiments, the capability to utilize higher repetition rates allows the use of lower peak power transmitters thus reducing system cost and complexity.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A light detection and ranging system, comprising:
   a transmitter configured to provide pulses of light, wherein the transmitter is configured to provide a code onto a respective pulse of the pulses of light, wherein the code comprises identification information for the respective pulse, the code comprising unequally sized first portions of energy and unequally sized second portions of non-energy within the respective pulse, wherein the unequal sized first portions of energy and unequally sized second portions of non-energy indicate the identification information for the respective pulse, wherein at least one of the portion of energy and the portion of non-energy is unique to a specific code; and
   a receiver comprising a processing circuit comprising a processor and a memory storing instructions that, when executed by the processor, cause the processor to:
   receive returns associated with the pulses of light striking and reflecting off one or more targets;
   identify pulse durations of the portion of energy of the pulse of light and pulse durations of the unequally sized portion of non-energy of the pulse of light;
   decode the code to determine the identification information; and
   decode the identification information of the pulse of light from the identified energy pulse durations and non-energy pulse durations.

2. The system of claim 1, wherein the receiver is further configured to identify a first pulse as associated with a first range bin based on a temporal difference of the first pulse, and identified a second pulse as associated with a second range bin associated with a different range based on a temporal difference of the second pulse.

3. The system of claim 1, wherein the receiver is further configured to discard a first pulse of light, responsive to the temporal difference of the first pulse being associated with a first range bin associated with a first range to a target.

4. The system of claim 1, wherein the code is a binary code, wherein each respective pulse of the pulses comprises a preamble provided within a pulse width of the respective pulse and a main portion, the main portion being larger within the pulse width than the preamble, the preamble comprising the identification information.

5. The system of claim 1, wherein the code provided as amplitude or frequency modulation on carrier wave energy associated with the pulses of light.

6. The system of claim 1 wherein the code comprises a preamble identifying the transmitter and a indicating a sequence order of the respective pulse.

7. The system of claim 1 wherein the code is provided by on/off keying or by frequency modulation and the identification information is use to determine an azimuth angle and an elevation angle of the respective pulse.

8. A radar system, comprising:
   a transmitter configured to provide pulses of radar signals, wherein the transmitter is configured to impose a code onto a respective pulses of the pulses of the radar signals, wherein the code on each respective pulse of the pulses comprises a preamble provided within a pulse width of the respective pulse and a main portion, the main portion being larger within the pulse width than the preamble, the preamble comprising identification information, wherein the transmitter comprises an on/off keying circuit for providing the code in the form of unequally sized first portions of energy and unequally sized second portions of non-energy within the respective pulse; and
   a receiver comprising a processor and a memory, the memory storing instructions that, when executed by the processor, cause the processor to:
   receive returns associated with the pulses of the radar signals striking one or more targets;
   detect the code by identifying pulse durations of the portion of energy of the pulse of light and pulse durations of the unequally sized portion of non-energy of the pulse of light to determine the identification information and to use the identification information to determine parameters associated with the respective pulse, the parameters comprising a source of the respective pulse, an azimuth of the respective pulse, and a time of the respective pulse; and decode the pulses to obtain the code in the form of the unequally sized first portions of energy and the unequally sized second portions of non-energy within the respective pulse.

9. The system of claim 8, wherein the code is indicative of a first range bin or a second range bin, the first range bin being associated with a different range to the one or more targets than the second range bin.

10. The system of claim 8, wherein the receiver uses the code to filter out returns from different sources.

11. The system of claim 8, wherein the code is a binary code and the radar system is an airborne weather radar system.

12. The system of claim 8, wherein the code is provided as amplitude or frequency modulation on carrier wave energy associated with the radar signals.

13. A platform operating in an environment with other platforms using active sensing, the platform comprising:

an active sensing system configured to provide a point cloud associated with the environment, the point cloud being used to navigate the platform, wherein the active sensing system comprises:

a transmitter configured to provide pulses of electromagnetic energy in a light band or a radar band or sonic energy; and a receiver configured to:

receive returns associated with the pulses of light striking one or more targets or associated with the sonic energy in the environment, wherein the transmitter is configured to provide a code onto the pulses, wherein the code on each respective pulse of the pulses comprises a preamble provided within a pulse width of the respective pulse, the preamble comprising identification information, wherein the receiver is configured to determine the identification information by identifying pulse durations of the portion of energy of the pulse of light and pulse durations of the unequally sized portion of non-energy of the pulse of light and to use the identification information to determine parameters associated with the respective pulse, the parameters comprising an azimuth of the respective pulse, wherein the transmitter comprises a frequency modulation circuit, wherein the frequency modulation circuit provides the code onto the pulses, and the receiver comprises a frequency demodulation circuit and decodes the code.

14. The platform of claim 13, wherein the code is indicative of a first range bin or a second range bin, the first range bin being associated with a different range to the one or more targets than the second range bin.

15. The platform of claim 13, wherein the electromagnetic energy is in the radar band.

16. The platform of claim 15, wherein the electromagnetic energy is a frequency modulated carrier wave and a frequency modulation rate is changed to provide the code.

17. The platform of claim 13, wherein the electromagnetic energy is in the light band and is infrared light.

18. The platform of claim 13 wherein the code comprises a main portion larger than the preamble.

19. The platform of claim 13 wherein the preamble comprises first portions of energy and unequally sized second portions of non-energy within the respective pulse identifying a range bin for the respective pulse.

20. The platform of claim 13 wherein the transmitter is configured to send overlapping pulses with different codes and is a low peak power transmitter.

* * * * *